United States Patent
Degerman (12)

(10) Patent No.: US 6,403,718 B1
(45) Date of Patent: Jun. 11, 2002

(54) METHOD FOR THE PRODUCTION OF A POWDER OF AN ELASTIC MATERIAL

(75) Inventor: Rolf Degerman, Skelleftea (SE)

(73) Assignee: Rolf Innovations Corporation, Stratford, CT (US)

( * ) Notice: Subject to any disclaimer, the term of this patent is extended or adjusted under 35 U.S.C. 154(b) by 0 days.

(21) Appl. No.: 09/625,631

(22) Filed: Jul. 26, 2000

(30) Foreign Application Priority Data

Sep. 16, 1999 (SE) ............................................. 99033218

(51) Int. Cl.[7] .......................... C08L 23/00; C08L 23/04; C08L 33/04; C08L 35/02
(52) U.S. Cl. ...................... 525/191; 525/222; 525/232; 525/240; 521/40.5; 521/41; 521/45.5; 528/481
(58) Field of Search ................................. 525/191, 222, 525/232, 240; 521/40.5, 41, 45.5; 528/481

(56) References Cited

U.S. PATENT DOCUMENTS

| | | | | |
|---|---|---|---|---|
| 4,735,982 A | * | 4/1988 | Orndorff, Jr. | ................ 524/269 |
| 5,791,278 A | * | 8/1998 | Orndorff, Jr. | ................ 114/219 |
| 6,218,474 B1 | * | 4/2001 | Valligny et al. | ............ 525/194 |

* cited by examiner

*Primary Examiner*—Nathan M. Nutter
(74) *Attorney, Agent, or Firm*—Young & Thompson

(57) ABSTRACT

A homogeneous powder mainly consisting of an elastic material, such as vulcanised rubber, is produced by first forming a composite body of larger particles of the elastic material, bound together by a thermoplastic material. The composite body is then subjected to mechanical treatment, e.g. grinding, producing a homogeneous powder having a particle size of less than 1.5 mm and consisting of up to about 80% by weigh of vulcanised rubber.

11 Claims, No Drawings

METHOD FOR THE PRODUCTION OF A POWDER OF AN ELASTIC MATERIAL

The present invention concerns a novel method for mechanical disintegration of elastic materials and in particular vulcanised rubber, an intermediate composite body used in said method and the powder produced by said method.

BACKGROUND OF THE INVENTION

Both environmental and economic considerations make the reuse of materials an important issue. Different waste materials are sorted, subjected to various treatments and used as raw materials for the manufacture of new products. In many cases the properties of the waste makes it difficult to process the material into a form suitable for reuse. Such properties can be the physical properties of the waste, such as its elasticity. One example of such materials is vulcanised rubber, the material of car tyres, conveyor bands, rubber mats, etc.

Worn out tyres are associated with special problems, both regarding recycling and disposal on waste disposal or landfill sites. In addition to containing a rubber matrix comprising natural and/or synthetic rubber, modern tyres also contain carbon black, plasticizers, cross-linking agents, anti-oxidants, anti-ozone agents and other performance improving additives plus a reinforcement structure, consisting of metal wire or fibres.

In additional to taking up a great deal of space on waste disposal sites, the dumping of tyres cause several other problems as well. The shape of the tyres cause it to slowly but surely migrate up to the surface of the disposal site and thereby disrupt the degradation process. Tyres also resist degradation as they are manufactured to resist both thermal and biological degradation, as well as mechanical wear. Furthermore, tyres resist ultraviolet radiation, ozone and other oxidants, as well as water and ice. Fires is used tyre depots or waste dumps containing tyres are problematic, as they have proven to very difficult to extinguish. In addition, such fires release toxic substances both in the smoke and in the water used to extinguish the fire.

The reuse of vulcanised rubber—a large source of which is used tyres—has posed several problems, in particular how to turn rubber waste into usable raw material for new products. As a result, only a lesser amount of the rubber waste is reused and thus the main part has to be burned, used as landfill or dumped together with municipal waste. The recycling of rubber has so far been focused on relatively uncomplicated applications, such as blasting mats, as an additive in asphalt or in the production of low vibration flooring.

Sheared or shredded rubber fragments can also be used as such, for purposes as improving soil, as filling material for building work, e.g. in road construction for recreation and trotting tracts, etc. Mixing in with compost has also been suggested.

U.S. Pat. No. 4,386,182 states, that the particulate vulcanised rubber for use in manufacturing thermoplastic electrostatic compositions should have a mean particle size of below 1.5 mm. According to another document, U.S. Pat. No. 5,157,082, concerning the manufacture of a thermoplastic composition including particles of vulcanised rubber, the rubber is required to be in the form of ground, small dispersed particles essentially of 1.5 mm number average or below. It is however difficult to achieve this degree of disintegration in industrial applications. The mechanical disintegration or grinding of vulcanised rubber to a particle size of 1.5 mm and below is made very difficult by the elastic properties of the material and the considerable development of heat during the mechanical treatment. Further, the elevated temperatures increases the elasticity of the rubber.

PRIOR ART

The presently applied solution to the above problem of disintegrating an elastic material to a homogeneous and fine particle size is the so-called cryogenic method. According to this method, rubber articles or rough rubber fragments are cooled to about minus 80° C. with liquid nitrogen. At that temperature, the rubber becomes brittle and can be crushed mechanically, typically in a hammer mill. The thus produced particulate rubber is then sieved in shaking sieves and sorted in the desired particle size fractions. The rubber powder is usually sorted in fractions from about 0 to 0.2 mm until 1 to 4 mm. In practice, however, the most desired fractions i.e. those below 1.5 mm, only constitute a lesser part of the total amount of particulate rubber. The above method is further relatively cost intensive, as the processing of 1 kg rubber requires about 0.5 kg nitrogen.

Further, WO 98/20067, by the present inventor, discloses a process for production of a material composition where recycled particulate vulcanised rubber constitutes the main component. The description discloses a process and composition, characterised by the use of expandable microspheres. The expandable microspheres are added in an amount of about 2 to 30 percent per weight of the composition.

Thus there still exists a need for new methods of treating elastic waste and in particular vulcanised rubber, in order to turn it into useful raw material and make possible its efficient reuse.

SUMMARY OF THE INVENTION

The present inventor has surprisingly found, that the above problems are solved by a method according to the attached claims. In summary, the problems are overcome by first forming a composite body, consisting mainly of vulcanised rubber waste and a lesser amount of a thermoplastic material as a binder, and then subjecting this composite body to mechanical treatment. A homogeneous, fine particulate powder is produced, more easily and at a lower cost than by the prior art methods.

DESCRIPTION

The present invention concerns a method for disintegration of elastic materials. The term "disintegration" is meant to comprise any conceivable method for mechanically producing a particulate matter or powder, such as grinding. The term "elastic material " in this context comprises all materials, the elastic properties of which make them difficult to disintegrate. The term "rubber" in this context means all vulcanised elastomer mixtures of natural or synthetic origin and is used as one example of elastic materials.

Relatively large pieces or shreds of vulcanised rubber are easily produced according to well known methods, e.g. by cutting or shredding. According to the present method, such shredded rubber is mixed with a thermoplastic material in particulate form. This mixture is then placed in a closable mould or cast and heavily compressed, preferably to about half of its original volume in order to expel possible air trapped in the mixture. The closed mould is then heated to the softening point of the thermoplastic material or to a temperature of about 150° C. to 200° C. Due to the influence of temperature and pressure, the thermoplastic material efficiently binds the rubber particles to a composite body, which retains its shape upon cooling and removing from the mould.

Importantly, the amount of rubber in the mixture can be varied according to the desired rubber content of the end product, the fine particulate rubber powder. The inventive method allows the user a high degree of liberty in choosing the composition of the mixture. Preferably the amount of rubber is the highest amount which still renders a composite body having the necessary mechanical strength. According to one embodiment of the invention, the amount of rubber is in the interval of about 50 to about 80% by weight of the total mixture, preferably about 80%. The amount of rubber is naturally dependent not only on the desired properties of the end product, but also on the binding properties achieved with the thermoplastic material and shred size used in each case. Importantly, the composition of the end product can be decided already in the selection of the raw materials (elastic material and binder), and their reciprocal amounts.

Depending on the choice of thermoplastic material and the amount of rubber, the particle size can be varied within 1.5 to 20 mm and a thickness of about 1 to 3 mm.

Preferably, the shredded rubber used in the present process is rubber having a particle size of about 5 to 10 mm and a thickness of about 3 mm. This is a frequently encountered and easily available residual product or waste, e.g. from the retreading of tyres.

The thermoplastic material sued according to the present invention is preferably chosen among the following plastics: EVA, PE, PP, EPM, an equivalent material or a mixture of any of said plastics. The thermoplastic can be either fresh or recycled, and it is used in the form of a powder or granulate. When selecting the type of thermoplastic material and its amount, consideration should be given to the intended use of the powder produced. If the powder is intended for further processing, such as die casting, compression, extrusion or injection moulding, the type and amount of thermoplastic material is naturally chosen with consideration of this further processing or end use. By proper selection of the raw material, the composition and quality of the end product is thus secured. Preferably the thermoplastic is EVA.

When the cooled composite body is removed from the mould, it can be handled as desired, e.g. stored, transported, sold, etc. before it is subjected to the mechanical treatment.

The shape of the mould and thus the composite body is chosen as to produce a body suited for further handling and in particular the mechanical treatment. Preferably the composite body has an elongate shape, e.g. a bar having a circular, rectangular or square cross section. Another shape of the composite body is a cylindrical body with the shape and dimensions of an ordinary vehicle tyre, for the purpose to fit into existing machines used in tyre retreading plants.

According to the invention, the composite body is subjected to mechanical treatment and pulverised by fast rotating cutting tools with a multitude of cutting teeth. The cutting tool can be a similar tool as those used for removing the tread surface on tyres before retreading. These frequently have saw-toothed blades or elements, attached in screw type grooves. It is obvious, that several other tools or configuration of tools can be applicable, provided that the desired particulate rubber powder is produced.

According to one embodiment of the invention, the composite body is subjected to mechanical treatment in machines specially designed for this purpose or in presently known machines, used in tyre retreading plants for removing the tread layer from used tyres, and pulverised by fast rotating cutting tools with a multitude of cutting teeth.

The particle size and the size distribution of the end product is controlled by proper choice of the tooth size of the cutting tool and the proper adjustment of the rotational speed of the cutting tool and/or the force, with which the composite body or the cutting tool are fed against each other. This has shown to be a very reliable way to control the particle size.

During the mechanical treatment, the cutting tool and/or the composite body is preferably cooled by a cooling medium, e.g. water or air.

The present process, in addition to solving the problems of the prior art methods, also opens up new possibilities. Being a considerably more cost efficient method of producing rubber powder of a homogeneous and comparatively fine particle size, the inventive method opens up for novel uses of waste rubber. The powder produced by the inventive method is easily adapted to the intended use, without further treatment or even without the subsequent addition of further components, as the properties of the product are influenced by the type and amount of thermoplastic material.

The present method is not limited to the treatment of vulcanised rubber or vulcanised rubber from car tyres or tyres from other vehicles, but also applicable to used conveyor belts, rubber mats, etc. As described earlier, the method gives the possibility to disintegrate elastic material of any origin without resorting to expensive cryothermic processing.

The powder produced by the inventive method is suitable for the production of various resilient, sound or vibration damping or heat insulting materials and in particular large volume products. A non-exhaustive list of products includes road and playground mats, sound barriers, fences or other barriers for noise control, mats for railway crossings, vibration or sound damping layer, insulating material etc. For the production of objects, where it is important that the material fills the mould cavities completely, the powder can be mixed with expandable microspheres, as described in WO 98/20067 by the sample inventor.

EXAMPLE

Rubber particles (8 kg) having a particle size of about 5 to 10 mm and thickness of about 3 mm were obtained from a retreading plant. EVA powder (2 kg) was obtained from Exxon Chemicals Co. The material was thoroughly mixed in a weight ratio of 80:20 and then compressed in a mould to removed air trapped in the mixture. The sealed mould was heated in a thermostatically controlled oven, at 150° C. for about 30 minutes. After cooling, the composite bodies were removed from the form.

The composite body was then subjected to mechanical grinding, using a conventional tool for removing the tread layer from used tyres. By adjusting the grinding parameters, a powder having a particle size of about 0.2 to 0.5 mm was produced. This powder was then used for the manufacture of sound barrier mats.

The above process was repeated using PE or polyethylene (2 kg) instead of EVA, also resulting in a highly satisfactory end product.

Although the invention has been described with regard to its preferred embodiments, which constitute the best mode presently known to the inventors it should be understood that various changes and modifications as would be obvious to one having the ordinary skill in this art may be made without departing from the scope of the invention which is set forth in the claims appended hereto.

What is claimed is:

1. In a method for the manufacture of particulate mixtures comprising vulcanized rubber, the improvement which comprises mixing fragments of said vulcanized rubber with a thermoplastic material, the mixture being cured in a mould producing a composite body of the fragments and the thermoplastic material, and the composite body being mechanically disintegrated to a powder having a particle size of less than abut 1.5 mm.

2. The method according to claim 1, wherein the mixture of the vulcanized rubber and the thermoplastic material is compressed and heated to about 150 to 200° C.

3. The method according to claim 1 wherein the thermoplastic material is chosen from the group consisting of EVA, PE, PP, EPA or a mixture thereof.

4. The method according to claim 3 wherein material is EVA.

5. The method according to claim 1 wherein a cutting tool and/or the composite body is cooled with a cooling medium selected from water or air.

6. The method of claim 1, further comprising the step of providing the fragments of vulcanized rubber by cutting or shredding vulcanized rubber tires into particles.

7. The method of claim 1, wherein the fragments of vulcanized rubber are about 80% by weight of the composite body.

8. The method of claim 1, wherein an entirety of the composite body is reduced to the powder.

9. A method for manufacturing a powder from vulcanized rubber tires, the method comprising steps of:

reducing vulcanized rubber tires to particles;

mixing the particles with a thermoplastic material, the particles being about 50 to 80% by weight of the mixture of the particles and the thermoplastic material;

compressing the mixture and heating the compressed mixture to a softening point of the thermoplastic material to form a composite body; and completely disintegrating the composite body into a powder having a particle size of less than 1.5 mm.

10. The method of claim 9, wherein the particles of vulcanized rubber are about 80% by weight of the composite body.

11. A method for manufacturing a powder from vulcanized rubber, the method comprising:

a mixing step for mixing vulcanized rubber particles with a thermoplastic material, the particles being about 50 to 80% by weight of the mixture of the particles and the thermoplastic material;

a curing step for compressing the mixture and heating the compressed mixture to form a composite body; and a disintegration step for completely disintegrating the composite body into a powder having a particle size less than 1.5 mm.

* * * * *

UNITED STATES PATENT AND TRADEMARK OFFICE
CERTIFICATE OF CORRECTION

PATENT NO. : 6,403,718 B1
DATED : June 11, 2002
INVENTOR(S) : Rolf Degerman

It is certified that error appears in the above-identified patent and that said Letters Patent is hereby corrected as shown below:

<u>Title page,</u>
Item [30], Foreign Application Priority Data, change the number of the Swedish priority application from "99033218" to -- 9903318 --.

Signed and Sealed this

Twelfth Day of November, 2002

*Attest:*

*Attesting Officer*

JAMES E. ROGAN
*Director of the United States Patent and Trademark Office*